L. J. BORDO.
GAGE COCK.
APPLICATION FILED JULY 6, 1907.

947,172.

Patented Jan. 18, 1910.

Witnesses

Inventor
Lambert J. Bordo
by his atty.

UNITED STATES PATENT OFFICE.

LAMBERT J. BORDO, OF PHILADELPHIA, PENNSYLVANIA.

GAGE-COCK.

947,172.   Specification of Letters Patent.   Patented Jan. 18, 1910.

Application filed July 6, 1907. Serial No. 382,472.

*To all whom it may concern:*

Be it known that I, LAMBERT J. BORDO, a citizen of the United States of America, residing in the city and county of Philadelphia, in the State of Pennsylvania, have invented a certain new and useful Improvement in Gage-Cocks, of which the following is a true and exact description, reference being had to the accompanying drawings, which form a part thereof.

The present invention relates to gage cocks used to determine the approximate water level in steam boilers.

The object of the invention is to increase the life of the major portion of the gage cock structure and improve the operation of the gage cock by the provision of a construction in which the valve proper and coöperating valve seat, the only parts subject to much wear and injury, may be easily and quickly repaired or renewed without necessarily interfering with the use of the boiler to which the cock is applied.

Figure 1:
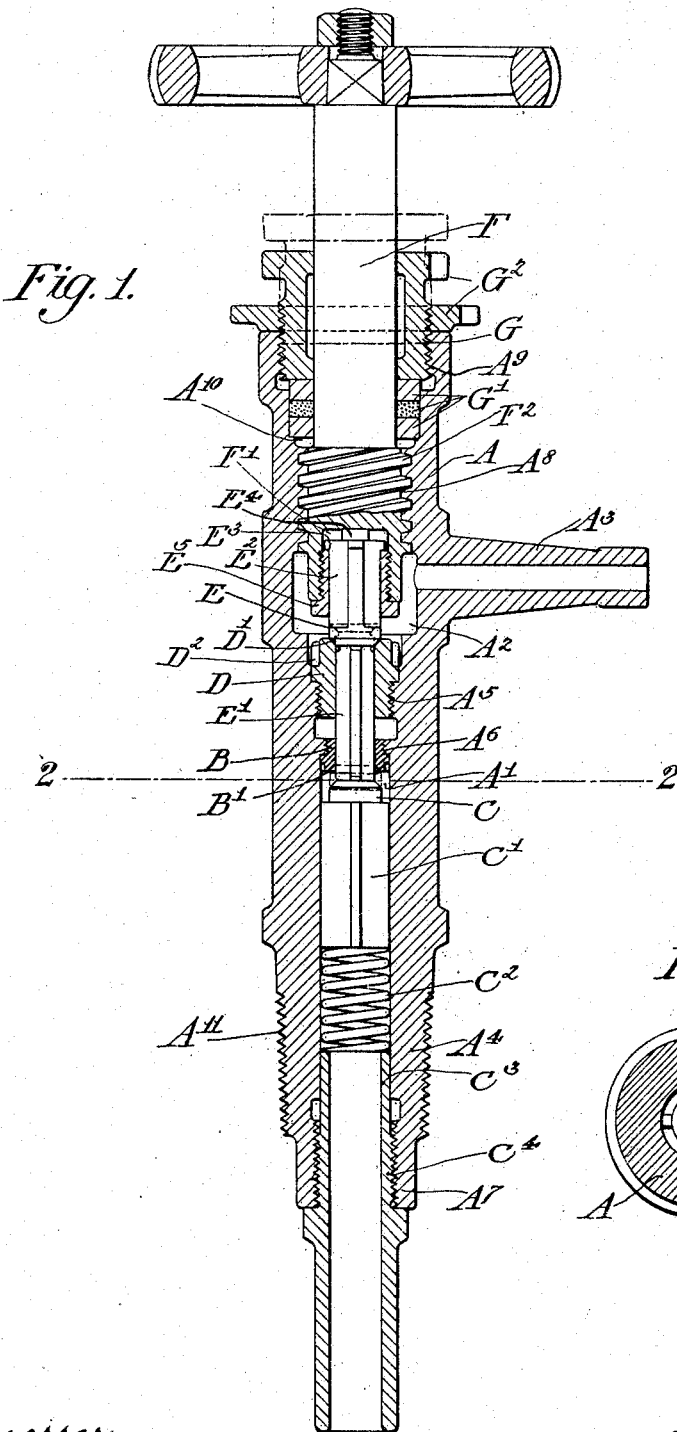
Figure 2:
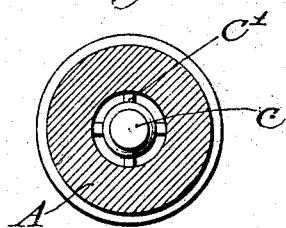

Of the drawings, Figure 1 is a sectional elevation of the gage cock, and Fig. 2 is a transverse section taken on the line 2—2 of Fig. 1.

In the drawings, A represents the valve casing provided at its inner ends with a threaded portion $A^{11}$ to be screwed into a threaded opening formed in the boiler wall. The casing A has an inlet chamber $A^1$ and an outlet chamber $A^2$ from which the discharge spout $A^3$ extends. Between the inlet and outlet chambers are provided two ported valve seat members B and D, which, in the form shown, are hollow plugs externally threaded to engage the internal threads $A^6$ and $A^5$ respectively formed in the casing. The valve seat member B is provided at its inner end with a seat $B^1$ against which the check valve C is adapted to seat itself under certain conditions. The check valve C has a fluted stem $C^1$ and is normally urged toward its seat by the boiler pressure, which may be supplemented by the action of a spring $C^2$ extending between the inner end of the stem $C^1$ and an abutment in the form of a hollow plug $C^4$ screwed into the threaded portion $A^7$ of the valve casing.

The valve seat member D is provided at its outer end with a seat $D^1$ against which the main valve E may seat itself. The valve E is provided with a fluted extension or stem $E^1$ which passes through the valve seat members B and D. This stem serves as a strut normally extending between the two valves and holding the valve C off its seat. The valve E is also provided with an outer stem portion $E^2$ which extends into the socket formed in the lower end of the valve spindle F, and is retained therein by a threaded sleeve $E^5$ which is screwed into the socket $F^1$ and bears against the shoulder $E^3$ carried by the stem portion $E^2$. The stem portion $E^2$ is also provided with a lug $E^4$ which engages the end wall of the socket $F^1$. The connection between the valve E and stem F is preferably such that the valve has a limited freedom to adjust itself properly on the seat $D^1$.

The valve spindle F is provided with an enlarged threaded portion $F^2$ which meshes with the threaded portion $A^8$ of the valve casing and carries the usual operating wheel at its outer end. The outer end of the valve casing is closed by a gland G threaded into the threads $A^9$ of the valve casing and is locked in place by a jam nut $G^2$. The gland holds packing in the form of rings $G^1$ compressed between its inner end and the shoulder $A^{10}$ of the valve casing. The packing normally acts as a stop against which the outer end of the threaded portion $F^2$ engages, thus in normal operation preventing any opening movement of the main valve E sufficient to permit the check valve C to close.

In normal operation the valve E is opened and closed by slight rotative movements of the spindle F, the opening movement being insufficient to allow the valve C to seat itself. In this movement the valve C remains in contact with the stem $E^1$. When it is desired to replace or repair the valve seat member D or valve E or both, the only parts subject to rapid wear, the jam nut $G^2$ is released and the gland F screwed out to about the position indicated in dotted lines in Fig. 1. The valve spindle is then rotated to carry the inner end of stem $E^1$ out to the dotted line position of Fig. 1. During this movement, the valve C seats itself against the valve seat member B. The gland G and spindle F are then removed from the valve and the valve E may be quickly and easily repaired or replaced, as may be the valve seat member D, which may be removed by a suitable tool arranged to rotate and retract it. For this purpose the member D may be provided with spanner openings $D^2$. I prefer to make the valve seat member B removable, though this is not entirely necessary as this member and the valve C, which is also removable, are not subject to much wear.

The gage shown is particularly adapted for use with locomotive boilers, where, as is well known, the engineer is almost continuously testing his water supply. As the result of this constant usage, with the high steam pressure employed, as well also as the bad water frequently used, the valve seat member D and valve E are subject to very rapid wear. With my invention these parts may be repaired or replaced in a few minutes while the full head of steam is maintained in the boiler, and this without any danger of scalding the hands of the engineer or other operator who makes the repairs, especially as the packing rings remain effective to prevent the passage of steam along the valve spindle until after the check valve C has seated itself. The valve seat members D and B, through which the stem $E^1$ passes, with the latter assist in properly guiding the valve E toward and from its seat.

Having now described my invention, what I claim as new and desire to secure by Letters Patent is:

1. In a gage cock, a hollow casing, a ported valve seat member detachably secured in and removable through the outer end of said casing, said casing being provided with a second valve seated port between the inlet end of the casing and the valve seat member, a check valve adapted to close said second port, a main valve for closing the port in said valve seat member, a strut normally extending between the two valves and serving to hold the check valve off its seat, an operating spindle to which said main valve is detachably secured, said spindle having an enlarged threaded portion $F^2$ which screws into a threaded casing portion $A^8$, a packing surrounding the spindle at the outer end of the threaded portion $F^2$ and normally serving as a stop to limit the opening movement of the main valve, and a retaining gland for the packing, in threaded engagement with the casing, the threaded engagement between the gland and casing being of sufficient length to allow an opening movement of the spindle sufficient to permit the check valve to seat itself without the entire removal of the gland.

2. In a gage cock, a hollow casing, a ported valve seat member detachably secured in and removable through the outer end of said casing, said casing being provided with a second valve seated port between the inlet end of the casing and the valve seat member, a check valve adapted to close said second port, a main valve for closing the port in said valve seat member and provided with an extension passing through both of said ports and in normal operation engaging the check valve to hold the latter off its seat, an operating spindle to which said main valve is detachably secured, said spindle having an enlarged threaded portion $F^2$ which screws into a threaded casing portion $A^8$, a packing surrounding the spindle at the outer end of the threaded portion $F^2$ and normally serving as a stop to limit the opening movement of the main valve, and a retaining gland for the packing, in threaded engagement with the casing, the threaded engagement between the gland and casing being of sufficient length to allow an opening movement of the spindle sufficient to permit the check valve to seat itself without the entire removal of the gland.

LAMBERT J. BORDO.

Witnesses:
ARNOLD KATZ,
D. STEWART.